(12) United States Patent
Wasserman et al.

(10) Patent No.: US 8,180,789 B1
(45) Date of Patent: May 15, 2012

(54) TECHNIQUES FOR QUERY GENERATION, POPULATION, AND MANAGEMENT

(75) Inventors: Brian Wasserman, Escondido, CA (US); George Hood, San Diego, CA (US); Gordon Brooks, San Marcos, CA (US); Linette Draper, Escondido, CA (US); Thomas Ryan, Valley Center, CA (US)

(73) Assignee: Teradata US, Inc., Dayton, OH (US)

( * ) Notice: Subject to any disclaimer, the term of this patent is extended or adjusted under 35 U.S.C. 154(b) by 130 days.

(21) Appl. No.: 11/294,174

(22) Filed: Dec. 5, 2005

(51) Int. Cl.
*G06F 17/30* (2006.01)

(52) U.S. Cl. .......... 707/766; 707/707; 707/802

(58) Field of Classification Search ............ 707/4, 3, 707/102, 104.1, 999.004, 999.102, 707, 766, 707/802, 999.001
See application file for complete search history.

(56) References Cited

U.S. PATENT DOCUMENTS

| | | | |
|---|---|---|---|
| 5,671,404 A | 9/1997 | Lizee et al. | |
| 5,884,299 A | 3/1999 | Ramesh et al. | |
| 6,028,605 A * | 2/2000 | Conrad et al. | 715/840 |
| 6,148,296 A | 11/2000 | Tabbara | |
| 6,285,998 B1 * | 9/2001 | Black et al. | 707/4 |
| 6,356,887 B1 * | 3/2002 | Berenson et al. | 1/1 |
| 6,438,540 B2 | 8/2002 | Nasr et al. | |
| 6,581,054 B1 * | 6/2003 | Bogrett | 707/4 |
| 6,609,123 B1 * | 8/2003 | Cazemier et al. | 707/4 |
| 6,684,207 B1 * | 1/2004 | Greenfield et al. | 707/3 |
| 6,748,386 B1 | 6/2004 | Li | |
| 6,778,979 B2 | 8/2004 | Grefenstette et al. | |
| 6,798,867 B1 | 9/2004 | Zirngibl et al. | |
| 6,882,995 B2 | 4/2005 | Nasr et al. | |
| 2004/0015511 A1 * | 1/2004 | Seefeldt et al. | 707/102 |
| 2004/0015925 A1 * | 1/2004 | Hanson et al. | 717/155 |
| 2004/0039755 A1 * | 2/2004 | Kunze | 707/104.1 |
| 2004/0254923 A1 * | 12/2004 | Piersol | 707/3 |
| 2005/0119580 A1 * | 6/2005 | Eveland | 600/509 |
| 2005/0234878 A1 * | 10/2005 | Dettinger et al. | 707/3 |
| 2006/0005112 A1 * | 1/2006 | Lilly et al. | 715/500 |
| 2006/0074934 A1 * | 4/2006 | Dettinger et al. | 707/100 |
| 2006/0116986 A1 * | 6/2006 | Radcliffe | 707/3 |
| 2006/0271507 A1 * | 11/2006 | Anzalone et al. | 707/2 |
| 2006/0271529 A1 * | 11/2006 | Dhamija et al. | 707/4 |
| 2007/0050323 A1 * | 3/2007 | Dettinger et al. | 707/1 |

* cited by examiner

*Primary Examiner* — Dennis Truong
(74) *Attorney, Agent, or Firm* — Schwegman, Lundberg & Woessner, P.A.

(57) ABSTRACT

Techniques are presented for query generation, population, and management. Queries are generically defined with metadata. The metadata identifies specific queries and specific parameters associated with a given query. When a query instance is desired, parameter values are dynamically acquired and used to populate portions of the metadata associated with a desired query. The query instance may then be executed as desired.

11 Claims, 3 Drawing Sheets

TECHNIQUES FOR QUERY GENERATION, POPULATION, AND MANAGEMENT

FIELD

The invention relates generally to queries, and more particularly to automated techniques for generating, populating, and managing queries.

BACKGROUND

Enterprises have accumulated knowledge about their customers, business practices, and financials within electronic data stores. A variety of software services or systems permit the enterprises to populate, query, mine, and manage their knowledge included within their data stores.

One problem associated with these services and systems is that there appears to be no centralized service or mechanism for managing access to and from the data stores in such a manner that knowledge can be reused and leveraged in an automated fashion within the enterprise.

As an example, consider an enterprise that queries and mines a data store for insurance fraud. If one fraud investigator develops a useful query for detecting a particular fraud situation; that query is often not easily communicated to other fraud investigators within the enterprise and is often not easily modified to a specific set of circumstances that the other fraud investigators may be faced with for their fraud scenarios. As a result, the knowledge that the original fraud investigator created for accessing the data store is lost or if not lost, effectively not usable or not usable in an efficient manner. That is, if subsequent fraud investigators are forced to request a database administrator to modify a search query for their particular scenarios then at least some benefits associated with the query are lost since additional time and resources are needed to use the original query.

Another problem with conventional data store access techniques is that existing queries are not easily enhanced or extended. Because queries are often hard coded and stored locally within a user's local environment, the ability to leverage certain aspects of the queries and extend them in an automated fashion is lost.

Thus, it can be seen that queries are not efficiently generated, populated, and managed within enterprise environments.

SUMMARY

In various embodiments, techniques for query generation, population, and management are provided. In an embodiment, a query management system is taught. The query management system includes a query builder, a query populator, and a query manager. The query builder receives generic definitions for queries. The query populator receives specific values for parameters associated with the generic query definitions for purposes of generating specific query instances. Furthermore, the query manager indexes, stores and retrieves the queries.

DETAILED DESCRIPTION

Figure 1:
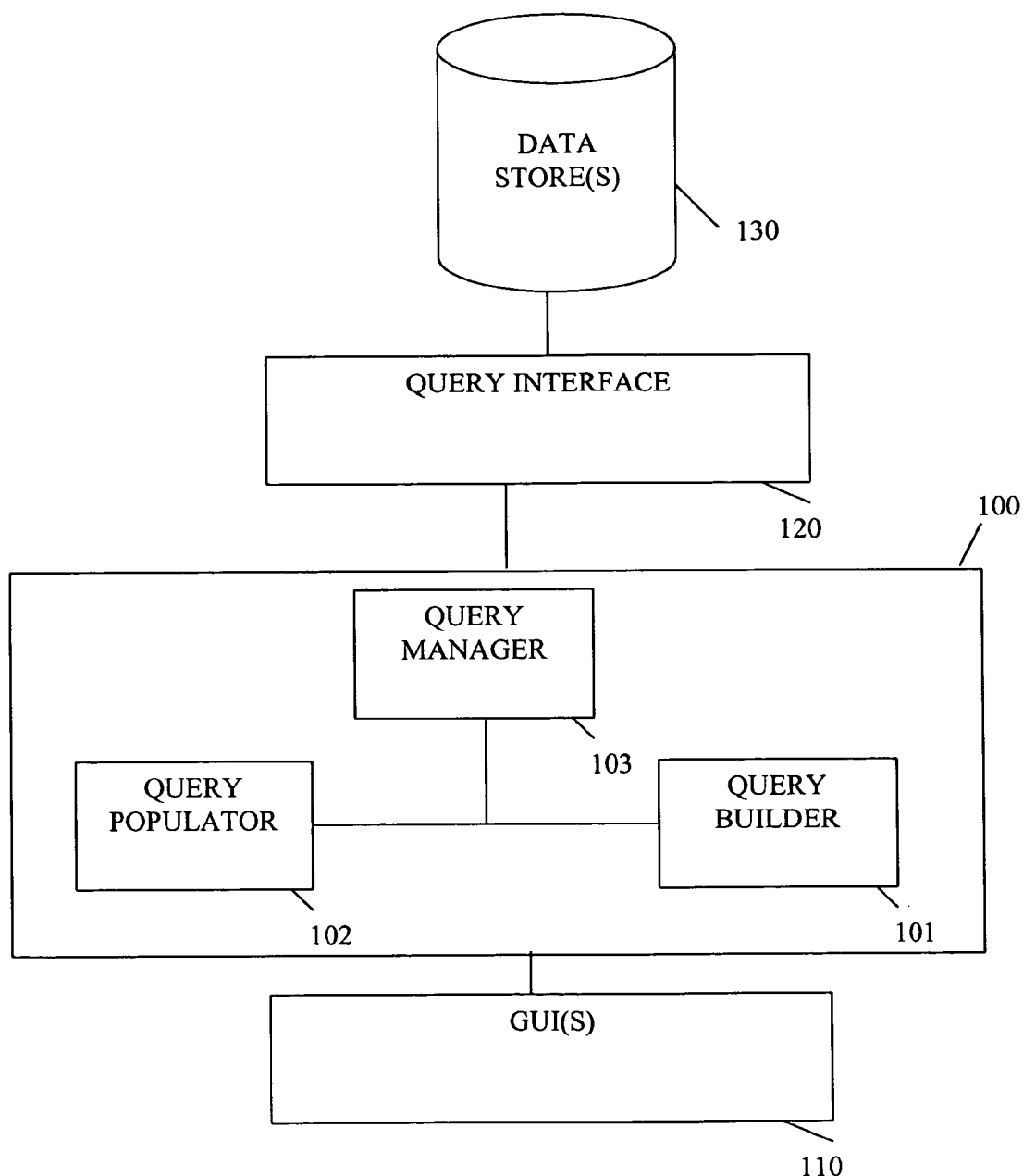
FIG. 1 is a diagram of a query management system, according to an example embodiment.

FIG. 1 is a diagram of a query management system 100, according to an example embodiment. The query management system 100 is implemented in a machine-accessible or computer-readable medium and is accessible over a network. The network may be wired, wireless, or a combination of wired and wireless.

FIG. 1 is presented for purposes of illustration only and is not intended to limit embodiments of the query management system 100, since it is readily apparent that some components of the FIG. 1 may be subsumed into other components, that additional components may be added, and/or that some components may be deleted; all without departed from the beneficial teachings presented herein and below.

The query management system 100 includes a query builder 101, a query populator 102, and a query manager 103. In some embodiments the query management system 100 may also include one or more user Graphical User Interfaces 110, a query interface 120, and one or more data stores 130. Each of these will now be discussed in turn.

The query builder 101 is a software service that receives definitions for queries and formulates and generates metadata that defines the individual queries. In fact, the metadata that the query builder 101 generates forms a backbone for the query management system 100. The metadata provides a data driven architecture for the query management system 100, which is flexible, extensible, more easily maintained, more easily integrated, and which supports better versioning control.

In an embodiment, the query builder 101 stores and records information about queries in a set of centralized metadata tables, which are accessible to and stored by the query builder 101 via a query interface 120 (e.g., SQL, etc.) that manages access to the metadata tables housed in a data store 130. This architecture centralizes access to the metadata, which defines the queries, and this architecture provides a technique for improved distribution, maintenance, and support of queries generated from the metadata.

Conventionally, queries are hard coded into specific user-defined instances and are housed in individual user databases and local environments. With the teachings presented herein, the queries are not hard coded; rather the queries are generically defined via metadata generated by the query builder 101. Additionally, the metadata that is used to derive specific query instances when needed are centrally housed and stored in environments that are independent of the user environments.

The query builder 101 may interactively communicate with one or more user Graphical User Interfaces (GUI's) 110 for purposes of receiving definitions for the queries and assembling or generated the generic metadata about those definitions. Some example information housed in the metadata is now provided for purposes of illustration only. It is to be understood that other information may exist and that some information may be omitted. Thus, the example metadata information should not be construed as limiting embodiments of this invention.

One example table expressed in the metadata may hold a list of queries and be called Query Table (T). Each row in T includes a variety of columns or fields: Query ID, Query Name, Number of Parameters, Query Author, Query Modify Date, and an In Use field. The Query ID is used for uniquely identifying an entry or a query being defined as metadata within T. The Query Name is used to convey descriptive information to users that may select a given query entry. Number of Parameters is a field used to communicate the number of parameters that a given query has. The parameters may also be expressed in other metadata tables and are discussed more completely below. The Query Author field identifies an author or resource that generated a given query. The Query Modify Date includes a creation and last modified date for a given query; this may also be used as an audit trail for a given query. The In Use field is a flag or bit that indicates whether a particular query is activated or deactivated. This permits global administration and control over queries, so that some queries can be phased out, removed, and/or replaced.

Another example metadata table may include a Query SQL table (S). S holds the actual query interface 120 statements, such as SQL statements, for a given query identified in T. S may include the following fields or columns: Query ID, Resource Security Level, and Query SQL. The Query ID is similar to T's Query ID and is used as a key to synchronize or match rows of T with information in S. Resource Security Level provides an identifier for a security access level for a given resource. In this manner, a single query defined initially in T may include multiple corresponding entries in S, where each unique entry in S identifies a different resource and a different security access level and each resource includes its own Query SQL based on its defined security access level. The Query SQL includes the actual SQL or other query interface 110 language statements which can be executed against one or more data stores 130 for purposes of executing a query. This is a parameterized statement, such as select X from Y where A=B, etc.

Continuing with the metadata table examples, yet a third metadata table may exists and be used by the query builder 101; this table is the Query Parameter table (P). P holds a list of the parameters that are to be specified in a given query. For example, the Query SQL field of example metadata table S listed an example parameterized statement as "select X from Y where A=B." In this example, the parameters are X, Y, A, and B. That is, these items are replaceable or modified to provide a specific instance of a given query. P may include the following fields: Query ID, Parameter ID, Parameter Title, Parameter Tip, Parameter Order, Parameter String, and Data Type Code. Again, the Query ID provides a linkage between the various metadata tables T, S, and P and is used for identifying a specific query definition. Parameter ID is used to identify a specific parameter item within a given query. Parameter Title provides descriptive information to a user and may be used to populate screen information that appears in the user GUI's 110. Parameter Tip is an optional item that denotes a comment or advice, which may also be displayed in the user GUI 110, such as "enter data format as mm-dd-yyyy." Parameter Order defines the order for displaying parameters within the GUI 110. Parameter String is the character string for a given parameter as it appears in the Query SQL field of table S, such as "X, Y, A, or B" in the example discussed above. The Data Type Code is used so that the query builder 101 and the query populator 102 know whether some parameter information have to include quotes or special characters to be recognized properly. That is, the data Type Code identifies the data type of a given parameter.

Still another metadata table called Query Column (C) may be used by the query builder 101. C includes metadata definitions for a list of columns that a given query returns when executed against the data stores 130. Whenever a query metadata definition is created in T a set of these columns in C is also created. The columns of C are used to dynamically generate reports. C includes the following columns or fields: Query ID, Column Name, Column Title, and Column Order. The Query ID links a specific query definition with the other metadata tables T, S, P, and C. Column Name is the name of a query column as created by the Query SQL field in S. Column Title is a desired header for the query column as it should appear in the generated report. Column Order is the order of a given column as it is desired to appear in the generated report.

In some embodiments, some other changes may be made to user-defined tables contained within the user environments to facilitate the processing of the query builder 101, the query populator 102 and the query manager 103. For example, the Query ID field may be added such that a specific query definition may be accessed from the metadata tables. In addition, security settings or attributes acquired from the user and the user's local environment may be added.

In addition, in some cases, a new table may be temporarily generated in the user's local environment via the user GUI's 110 to facilitate operations of the query populator 102. For example, a Query Parameters (QP) table may include fields such as Query ID, Parameter ID, and Parameter Value. The Query ID links to a specific query definition housed in the tables T, S, P, and C. The Parameter ID links a specific parameter included in P. The Parameter Value is a user-supplied substituted value for a parameter identified by the Parameter ID. This permits a unique query instance to be generated dynamically by the query populator 102.

The query builder 101 generates the metadata tables by interactively receiving information from users or resources. In some cases, this information or these query definitions are received via the GUI's 110. The metadata may also be at least partially assembled and organized from other metadata included within the data stores 130. Thus, a user may select some portions of the definitions from lists of available information, where the lists are supplied to the user via the GUI's 110 from the query builder 101. The primary responsibility of the query builder 101 is to define queries and represent those queries generically as metadata within the data stores 110. Example metadata tables were described in detail above to illustrate how this may be done in some embodiments.

The query populator 102 also interacts with a user or resource. In some cases, this interaction also occurs via the user GUI's 110. It is to be understood that although the term "user" is being used that term may include any resource. A resource is a service, system, device, or person that is uniquely identified within an electronic environment and that interacts with other services, devices, systems, or users. Additionally, a "data store" 130 may include a database, a collection of disparate databases organized as a data warehouse, a directory, an electronic file, or various combinations of these items.

The query populator 102 identifies a Query ID from a resource and an ID associated with the resource. Armed with this information, the query populator 102 access the data stores 130 to acquire the metadata associated with a query, which is associated with the Query ID. As was explained above, this may also entail accessing a number of tables via a search through the query interface 120 to the data stores 130. Next, the query populator 102 interacts with the resource to acquire specific values for parameters of the query. These parameters include identifiers that permit the query populator 102 to index into the metadata and substitute previous parameter values with the resource provided values. At this point, the query populator 102 has a specific query instance having parameter values defined or supplied by the resource.

The query manager 103 is used to manage the metadata associated with the queries. That is, the query manager 103 indexes, stores, and retrieves the queries when requested by the query builder 101 or the query populator 102. In some embodiments, the query manager 103 may be subsumed within the operations of the query builder 101, the query populator 102, and/or the query interface 120. The query manager 103 may also be used to submit or schedule for execution a given query instance produced by the query populator 103.

The query manager 103 may also be used to uniquely associate query instances with unique identifiers and with resource identifiers. In this manner, a specific resource may be associated with a specific query instance. The query instances may be automatically visible and selectable within a user GUI 110 when a resource logs in or access the GUI 110.

In some embodiments, the query manager 103 may also be used to perform global administration. For example, some queries may be deactivated such that they are no longer available for selection to create query instances by the query populator 102. Other administration may include deletes and/or modifications to existing query definitions. Still further, security can be added or modified by the query manager 103 for a given query definition.

The query management system 100 includes three primary services, namely the query builder 101, the query populator 102, and the query manager 103. In some embodiments, these services 101-103 may interact with resource-driven GUI's 110 for purposes of receiving information related to query management and execution. On the back end, the services 101-103 use a query interface 120 to store, manage, distribute, and retrieve metadata associated with queries from one or more data stores 130.

The query management system 100 provides a novel architecture and technique for defining metadata that generically defines queries. The metadata is centrally managed and distributed and accessed in an automated manner. Moreover, the metadata is used to dynamically and in real time derive query instances defined by resources. The query instances include specific parameter values for a given query as desired by a resource. The query instances are automatically executed and the results dynamically displayed in reports.

Figure 2:
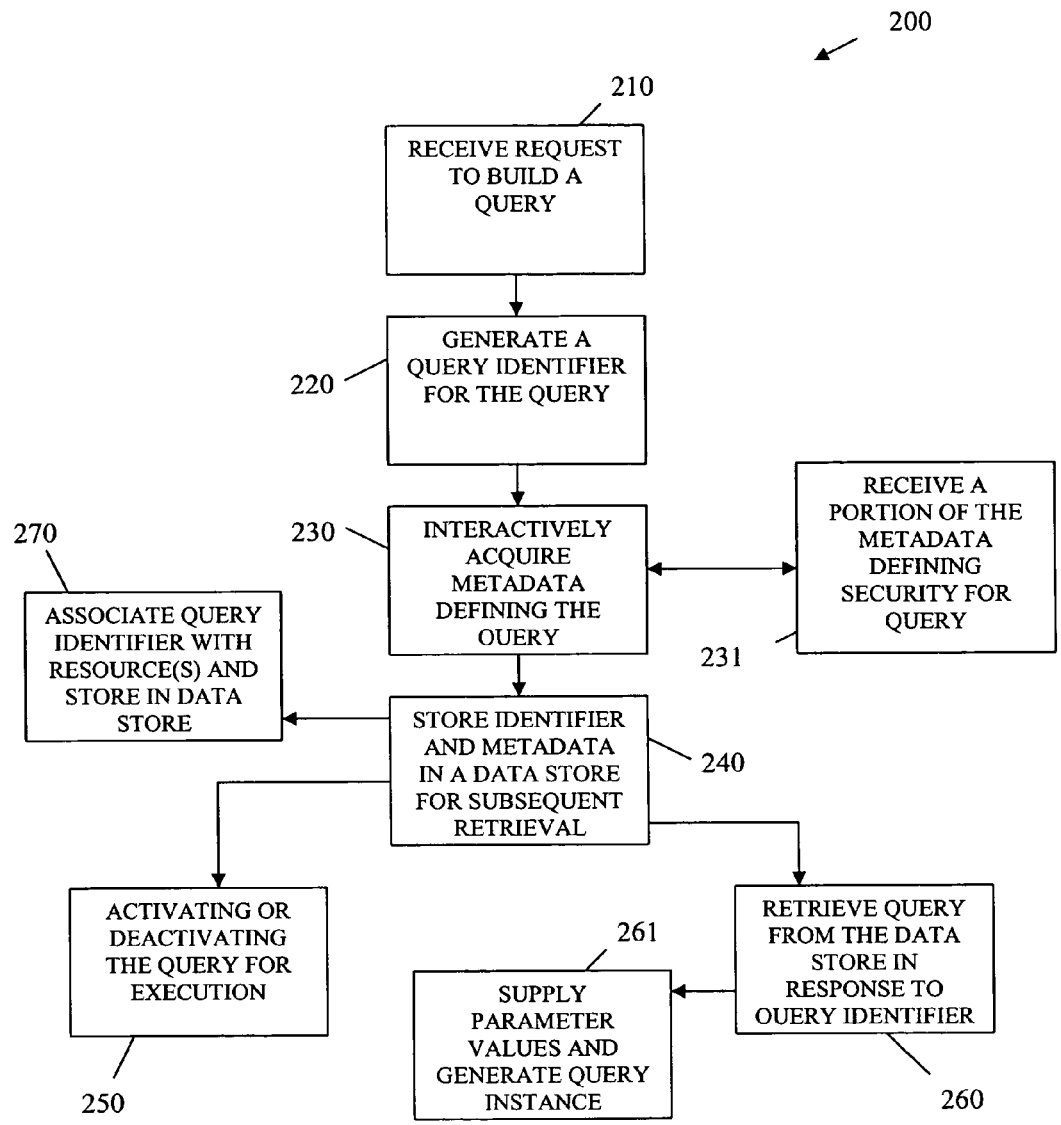
FIG. 2 is a diagram of a method for query generation, according to an example embodiment.

FIG. 2 is a diagram of a method 200 for query generation, according to an example embodiment. The method 200 (hereinafter "query building service") is implemented in a machine-accessible and readable medium and is accessible over a network. The network may be wired, wireless, or a combination of wired and wireless. In an embodiment, the query building service represents the processing of the query builder 101 depicted in the query management system 100 of FIG. 1.

The query building service manages and generates metadata that defines queries. Example metadata tables and information were provided above with the descriptions of the query management system 100 of FIG. 1.

At 210, the query building service receives a request to build a new query. In an embodiment, the request originates from a resource using a GUI, such as the GUI 110 of FIG. 1. In other embodiments, the request to build a new query may be received via an automated script or service.

At 220, the query building service generates a query identifier for the desired new query. The query identifier is a linking element of information housed in the metadata that is generated by the query building service for identifying the new query. Examples of query identifiers were provided above with respect to the discussion of FIG. 1.

At 230, the query building service interactively acquires metadata that further defines the new query. Some examples of metadata were provided above with respect to the discussion of FIG. 1. In an embodiment, at 231, some portion of the metadata may be associated with defining security for a new query. That is, use or access to a given query may be restricted based on security access levels. Portions of the metadata may be supplied by a resource or portions may be selected by a resource from a list of available metadata housed in a data store. In this manner, the metadata does not have to be created from scratch; rather, in some cases the metadata may be assembled from previous versions of the metadata at the direction of a resource using a GUI to interact with the query building service.

At 240, the query building service organizes, links, and stores the query identifier and its associated metadata in a data store for subsequent retrieval. That is, the metadata that defines the new query and it is associated with an identifier; the identifier permits different aspects or portions of the metadata to be retrieved from the data store on demand.

In an embodiment, at 250, the query building service may activate or deactivate the new query via its metadata for execution. So, a parameter or field of the metadata may be associated with making the new query and its defining metadata visible to resources or invisible to resources. This feature permits global administration on the new query and other queries housed in the data store. Examples of this technique for activating and deactivating a query were provided above with the query management system 100 of FIG. 1.

According to an embodiment, at 260, the query building service may subsequently retrieve the query defined by the metadata from the data store in response to receiving the query identifier that is associated with the query. This may occur when a resource wants to recall a query for purposes of generating a specific query instance for that query or may occur when some maintenance or modification is desired on the query.

In yet another embodiment, at 261, the query building service may supply parameter values for a recalled query for purposes of generating a query instance. This feature may also be supplied by other services such as the query population service described below with respect to the method 300 of FIG. 3.

Figure 3:
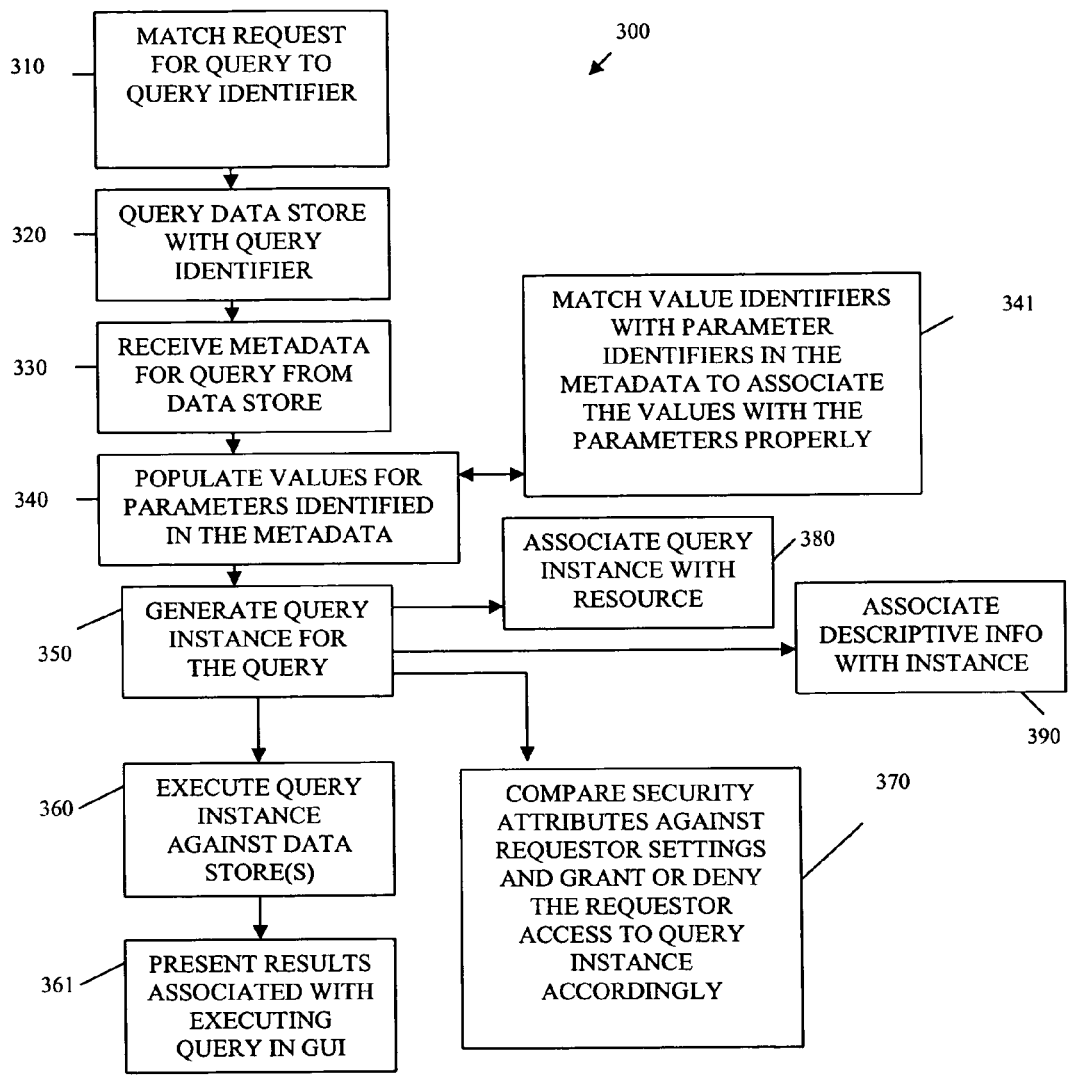
FIG. 3 is a diagram of a method for query population, according to an example embodiment.

FIG. 3 is a diagram of a method 300 for query population, according to an example embodiment. The method 300 (hereinafter "query population service") is implemented in a machine-accessible and readable medium and is accessible over a network. The network may be wired, wireless, or a combination of wired and wireless. In an embodiment, the query population service is implemented as the query populator 102 of the query management system 100 presented above in FIG. 1.

Instances of the query population service are designed to interact and communicate with instances of the query building service, which were presented above with the method 200 of FIG. 2. The query building service is responsible for building and associating metadata definitions for desired queries within a data store. The query population service, as will be seen below, is responsible for acquiring specific values for a desired query and generating a query instance for a resource.

At 310, the query population service matches a request to recall a query with a query identifier. At 320, the query population service uses the query identifier to query a data store for purposes of acquiring the metadata associated with a query that is assigned the query identifier.

At 330, the query population service receives the desired metadata from the data store in response to the submitted query. At 340, the query population service populates values for parameters that are identified in the metadata. In one embodiment, at 341, this entails matching parameter identifiers in the metadata against identifiers for values supplied by a resource that is interacting with the query population service. Thus, the query population service dynamically and in real time modifies SQL statements housed in the returned metadata with specific desired parameter values supplied by a resource that is interacting with the query population service.

Once the desired parameter values are populated into the proper SQL locations associated with portions of the returned metadata, at 350, the query population service generates a specific query instance for the query. A query instance is one that is populated with customized parameter values received by a resource.

In some embodiments, at 360, the query population service may also be used to execute the query instance against the data store or one or more additional data stores. That is, the query population service may execute the query instances that it generates if requested or directed to do so by a resource or by profiles associated with the resource or profiles associated with the query. At 361, the results associated with executing the query instances may be dynamically presented to the resource in a GUI or a report.

According to an embodiment, at 370, the query population service may also compare attributes associated with the query metadata against settings or configurations associated with the requesting resource. If this comparison is favorable, then the query instance may be supplied to the resource for use. However, if this comparison is unfavorable, then the query population service may deny the resource access to the generated query instance. This permits the query population service to enforce any security desired or dictated by the query and as defined in the query's metadata.

In yet another embodiment, at 380, the query population service may also associate the query instance with the resource and record and store this association in the data store. Thus, any query instances developed by a specific resource may be associated with that resource and presented to the resource in customized GUI's when requested.

In still another related embodiment, at 390, the query population service may permit descriptive information about the generated query instance to be supplied by the resource. The descriptive information may be used to present the query instance to the resource at a later date via the GUI or used to present the query instance to other resources that subscribe or are to receive the query instance.

It has now been demonstrated how query creation, management, and use may be automated to capture and reuse knowledge within an enterprise. This permits queries to be generically represented and dynamically populated on demand and allows for improved administration of queries throughout the enterprise.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method stored in a non-transitory computer-readable medium and executed by a computer to perform the method, comprising:
   receiving a request to build a query;
   generating a query identifier for the query;
   interactively acquiring metadata defining the query for purposes of dynamically and in real time generating the query, the metadata is centrally managed over a network and is stored in environments that are independent of user environments that use the metadata to establish the query, the metadata for defining the query assembled in three tables, a first table is a query table and includes a query identifier, a query name, a total number of parameters for the query, a query author identifier, a query modify date, and a use field that is a flag indicating whether the query is activated for use or deactivated so the query cannot be used, a second table is a Structured Query Language (SQL) table that includes an index on the query identifier and includes an entry for the query identifier within the second table for query SQL for executing the query, the entry in the SQL table also includes a security level for a resource that makes the request, the query SQL is parameterized, each parameter including a parameter identifier, a third table is a query parameter table indexed on the query identifier and the parameter identifier and each entry in the third table includes a parameter title, a parameter tip, a parameter order, a parameter string, and a data type code for a particular parameter identifier associated with that entry, the parameter string is a specific replaceable parameter item, and the parameter title providing descriptive information to a user and used to populate screen information and the parameter order defining an order for the replaceable parameter's items and the parameter string representing the replaceable parameter;
   generating a query column table for when the query is executed including definitions for columns that house results of the query, the columns of the query column table used for generating reports;
   storing the query identifier and the metadata in the three tables for subsequent retrieval; and
   using a particular field of the metadata as an indication for whether to make the query and the metadata visible or invisible to other resources.

2. The method of claim 1 further comprising, activating or deactivating the query for execution.

3. The method of claim 1 further comprising, retrieving the query from the three tables in response to receiving the query identifier.

4. The method of claim 1 further comprising:
   retrieving the metadata from the three tables in response to receipt of the query identifier;
   supplying values to a number of parameters included in the metadata in response to receiving the values from a graphical user interface (GUI); and
   generating an instance of the query having the values.

5. A computer-implemented method stored in a non-transitory computer-readable medium and executed by a computer to perform the method, comprising:

matching a request for a query with a query identifier;

querying three tables with the query identifier;

a first table is a query table and includes the query identifier, a query name, a total number of parameters for the query, a query author identifier, a query modify date, and a use field that is a flag indicating whether the query is activated for use or deactivated so the query cannot be used, a second table is a Structured Query Language (SQL) table that includes an index on the query identifier and includes an entry for the query identifier within the second table for query SQL for executing the query, the entry in the SQL table also includes a security level for a resource that makes the request, the query SQL is parameterized, each parameter including a parameter identifier, a third table is a query parameter table indexed on the query identifier and the parameter identifier and each entry in the third table includes a parameter title, a parameter tip, a parameter order, a parameter string, and a data type code for a particular parameter identifier associated with that entry, the parameter string is a specific replaceable parameter item, and the parameter title providing descriptive information to a user and used to populate screen information and the parameter order defining an order for the replaceable parameter's items and the parameter string representing the replaceable parameter;

receiving metadata for the query from the three tables, the metadata centrally managed over a network in environments that are independent from that which is used by users to use the query;

populating values for parameters identified in the metadata, and at least one parameter value that identifies the parameter tip that provides advice to a user on how to enter a particular parameter value and the parameter tip is displayed via a graphical user interface (GUI) to the user that supplies the values interactively via the GUI, dynamically and in real time generating a query instance for the query that defines a new query that is to be executed against a data store when the use field within the metadata indicates that the query is activated, the use field also indicates whether the metadata if visible for the query to other resources for global administration;

and generating a query column table to house results from the query and to generate reports.

6. The method of claim 5 further comprising, executing the query instance against the data store or one or more additional data stores.

7. The method of claim 6 further comprising, presenting the results associated with executing the query instance in the graphical user interface (GUI).

8. The method of claim 5 further comprising:

comparing security attributes included in the metadata against one or more settings associated with a requestor of the query instance;

denying the requestor access to the query instance if the comparison was unfavorable; and granting the requestor access to the query instance if the comparison was favorable.

9. The method of claim 5, wherein populating further includes matching identifiers associated with the values to parameter identifiers included within the metadata for the parameters to properly associated selective ones of the values with their corresponding parameters.

10. The method of claim 5 further comprising, associating the query instance with a resource identifier and recording the association in the three tables.

11. The method of claim 5 further comprising, associating descriptive information for the query instance and recording the association in the three tables.

* * * * *